United States Patent
Tura et al.

(10) Patent No.: US 6,242,128 B1
(45) Date of Patent: Jun. 5, 2001

(54) FASTENER SYSTEM OF TAB BUSSING FOR BATTERIES

(75) Inventors: Drew Tura; David Brongiel, both of San Jose, CA (US)

(73) Assignee: Valence Technology, Inc., Henderson, NV (US)

( * ) Notice: Subject to any disclaimer, the term of this patent is extended or adjusted under 35 U.S.C. 154(b) by 0 days.

(21) Appl. No.: 08/163,414

(22) Filed: Dec. 6, 1993

(51) Int. Cl.[7] ............................. H01M 2/26; H01M 6/00
(52) U.S. Cl. ...................... 429/161; 429/211; 29/623.1
(58) Field of Search .................................. 429/211, 209, 429/161, 160, 123, 178; 29/730, 623.1

(56) References Cited

U.S. PATENT DOCUMENTS

| | | | |
|---|---|---|---|
| 528,445 | * | 10/1894 | Rhetts ................................ 429/239 |
| 885,562 | * | 4/1908 | Alt ...................................... 429/161 |
| 940,288 | * | 11/1909 | Tate ................................. 429/161 X |
| 1,388,656 | | 8/1921 | Lyndon . |
| 1,932,136 | * | 10/1933 | Hole ...................................... 29/730 |
| 2,845,470 | * | 7/1958 | Haskell et al. ....................... 429/239 |
| 3,640,775 | * | 2/1972 | Fitchman et al. .................... 429/161 |
| 3,873,366 | * | 3/1975 | Sundberg ............................. 429/160 |
| 3,907,599 | | 9/1975 | Fanciullo et al. . |
| 3,988,168 | | 10/1976 | Bruneau . |
| 4,070,528 | | 1/1978 | Bergum et al. . |
| 4,091,184 | | 5/1978 | Erisman et al. . |
| 4,152,825 | | 5/1979 | Bruneau . |
| 4,646,430 | * | 3/1987 | Clarke ............................. 429/161 X |
| 4,997,732 | | 3/1991 | Austin et al. . |
| 5,126,217 | | 6/1992 | Rao . |

FOREIGN PATENT DOCUMENTS

| | | |
|---|---|---|
| 0059496 | 9/1982 | (EP) . |
| 0199478 | 10/1986 | (EP) . |
| 0271086 | 6/1988 | (EP) . |
| 2097516 | 3/1972 | (FR) . |
| 2145256 | 12/1972 | (FR) . |
| 2418547 | 9/1979 | (FR) . |
| 1209336 | 10/1970 | (GB) . |
| WO9410710 | 5/1994 | (WO) . |

OTHER PUBLICATIONS

Patent abstracts of Japan, vol. 7, No. 226 (E–202), Oct. 7, 1983 & JP,A,58 115757 (Matsushita Denki Sangyo KK), Jul. 9, 1983.

"An 83 AH Ni–H2 Battery for Geosynchronous Satellite Applications," by Yang et al., IEEE 1989, pp. 1375–1379. (Month not available).

Adhesives Research, Inc. product brochure. 1993 (Month not available).

Expanded Metal brochure, Thomas Register 1993. (Month not available).

* cited by examiner

*Primary Examiner*—Anthony Skapars
(74) *Attorney, Agent, or Firm*—Harness, Dickey & Pierce, PLC

(57) ABSTRACT

A fastener system for tab bussing for the multicell batteries and the apparatus to assist this system are described. The holding device is used to hold the tab bussing structure together. The holding device can be a bolt or a rivet. It minimizes the electrical resistance of the multicell battery, allows rework and achieves high energy efficiency and small dimensions for the multicell lithium-polymer batteries.

16 Claims, 4 Drawing Sheets

FASTENER SYSTEM OF TAB BUSSING FOR BATTERIES

BACKGROUND OF THE INVENTION

This invention relates to a method and apparatus for tab bussing of multicell batteries. More specifically this application relates to a tab bussing structure using a holding device for fastening the tabs and a method for fastening the tabs.

In the prior art a thermally induced bond between the tabs of the single cell batteries was utilized to build the multicell batteries comprising a number of single cell batteries. See U.S. Pat. No. 4,152,825 Bruneau; U.S. Pat. No. 4,070,528 Bergum; U.S. Pat. No. 4,091,184 Erisman; U.S. Pat. No. 3,907,599 Fanciullo.

However, to make a thermally induced bond it is necessary to apply high temperature and high pressure, which makes the manufacturing process of such batteries burdensome. It can also damage the battery internal components. Therefore, the thermally bonded tab bussing structure may not be preferable for some batteries.

The first objective of the proposed invention relates to a manufacturing process of making the multicell battery without use of high heat or high pressure.

The second objective of the current invention relates to an energy efficient multicell battery. It is very important for purposes of creating an energy efficient electrical car to have a small and energy efficient multicell battery. Indeed, the main problem facing the creation of a commercially viable electrical car is the necessity to place inside the very limited car space sufficient amount of energy producing capabilities. The smaller and the more energy efficient the battery, the more energy producing capabilities can be placed inside the limited car space. Therefore, a small and energy efficient battery can make the real difference in the race for the commercially successful electrical car.

Regular cars with gasoline engines also benefit from energy efficient SLI (starting, lighting, igniting) batteries. A good SLI battery is designed to deliver a relatively high impulse of electrical power. Therefore it is also desirable to provide sufficient electrical power per cell which can be delivered by a small energy efficient multicell battery.

High internal electrical resistance prevents a multicell battery from delivering the maximum electrical power per cell, because significant amount of electrical energy is dissipated inside the multicell battery. Therefore, it is paramount for a multicell battery to have small effective electrical resistance.

The effective electrical resistance of the multicell battery depends on many factors. One of those factors is the presence of gaps between the tabs of the tab structure. The electrical resistance of the multicell battery is increased by these gaps in the tab structure. The thermally induced bonded batteries, described above, have relatively high resistance, because their tab bussing structures have significant gaps therein between tabs.

A second objective of the present invention is to offer a new fastener method of tab bussing of the multicell battery because this method permits one to build a multicell battery which has low electrical resistance and occupies a very limited space.

SUMMARY OF THE INVENTION

One aspect of the present invention is directed to a method of tab bussing for a multicell battery. The multicell battery includes a plurality of individual cells. Each cell has at least one tab. The method comprises a step of forming at least one hole through a tab of each individual cell, and inserting into a hole in a tab of each cell a holding device and securing the holding device to the tabs.

Another aspect of the present invention is directed to a tab bussing structure of a multicell battery. The multicell battery comprises a plurality of individual cells, each cell having at least one tab. Each tab has at least one hole therein. At least one holding device passes through a hole of a tab of each cell and is secured to the tabs. The holding device can be a rivet. The holding device can also be a bolt.

Yet one more aspect of the present invention is directed to a multicell battery. The multicell battery comprises a plurality of individual cells. Each cell includes an anode layer, a cathode layer, an electrolyte layer separating the anode and cathode layers, and at least one tab with at least one hole therein. The battery includes at least one holding device. The holding device passes through a hole in a tab of each cell and is secured to the tabs.

In the preferred embodiment, the multicell battery comprises thirty individual cells, wherein five individual cells are placed in a stack. The tabs of six stacks, a first plate, a terminal and a second plate comprise a single bussing structure. Each holding device passes through the holes formed in the tabs from all cells, the terminal, and the top and bottom plates.

BRIEF DESCRIPTION OF THE DRAWINGS

Identical components in the different figures are labeled by the same numerals.

DETAILED DESCRIPTION OF THE PREFERRED EMBODIMENTS

The fastener method and apparatus employing the fastener method of tab bussing for the lithium-polymer batteries developed in the present invention allows one to build an energy efficient and low electrical resistance multicell battery.

The fastener method also permits one to build a reworkable multicell battery. Indeed, the fastener can be screwed and unscrewed easily. The relative simplicity of dismantling and re-assembling the bussing structure makes the tab bussing structure a reworkable one.

Figure 1:
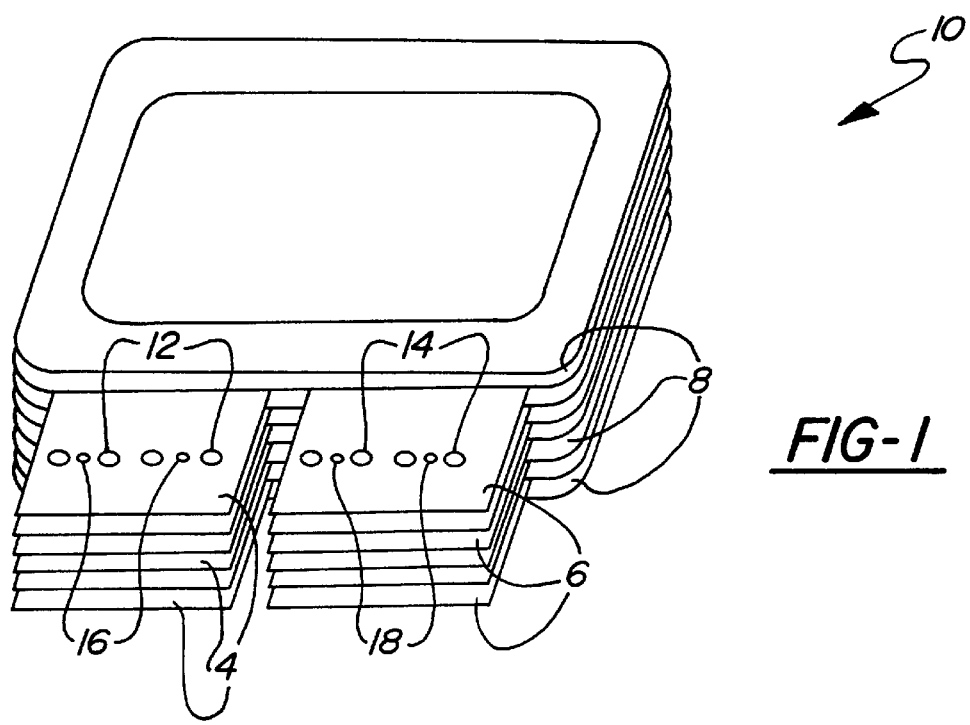
FIG. 1 is a perspective view of a multicell battery with a plurality of anode and cathode tabs.

FIG. 1 illustrates the construction of a multicell battery 10, comprising a plurality of individual cells 8. Each individual cell has at least one bussing tab. As shown in FIG. 1, each cell has an anode tab 4 and a cathode tab 6. The anode bussing tab is a copper sheet. The cathode bussing tab is an aluminum sheet. There are twice as many cathode tabs as anode tabs.

At least one holding hole, such as holes 12 and 14, and at least one alignment hole, such as holes 16 and 18, are formed through each of the anode and cathode tabs. A holding hole is one for holding a holding device that fastens the tabs together into a tab bussing structure. An alignment hole is one for aligning the tab bussing structure. The aligning hole is preferably smaller than the holding hole, as shown in FIG. 1. In the preferred embodiment there are four holding holes and two alignment holes drilled through each anode tab and each cathode tab.

Figure 2:
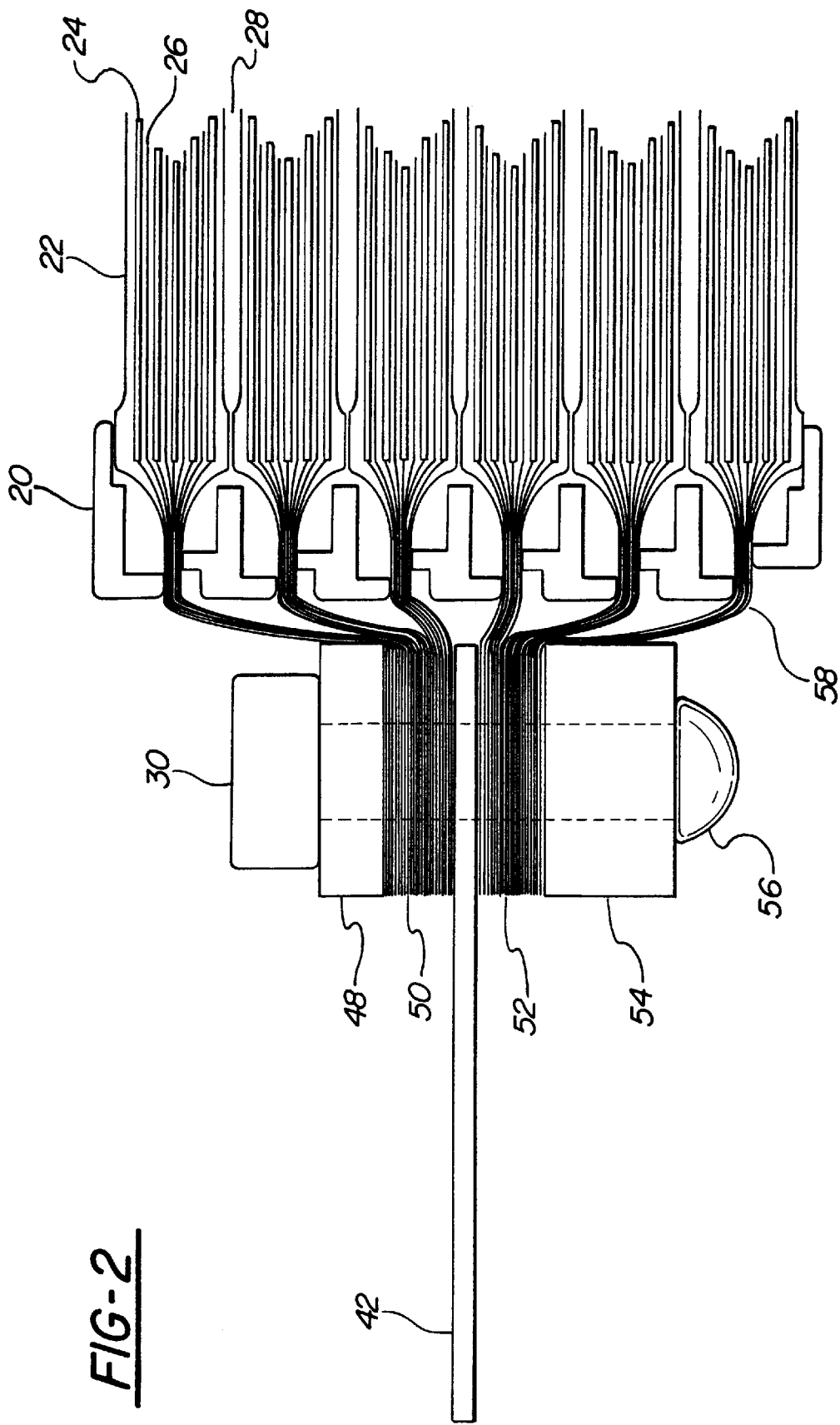
FIG. 2 illustrates the first embodiment. It shows a partial cross-section and partial side view of a portion of the battery of FIG. 1 after the multicell battery is put together wherein a rivet is used as a holding device.

FIG. 2 depicts a partial cross-sectional and partial side view of a portion of the multicell battery of FIG. 1 after the multicell battery is assembled with the use of rivets 30 as holding devices. FIG. 2 depicts the battery portion comprised of a stack of laminar bi-cells such as laminar bi-cell comprising a lithium anode 24 and two cathode sections 22 and 26. The anode and cathode tabs are preferably connected to their respective anode and cathode layers through current collector layers (not shown). FIG. 2 illustrates also a tab bussing structure suitable for both the cathode tabs and the anode tabs. In the case of cathode tabs, the individual tabs 58 are welded in groups of ten. In the case of anode tabs, the individual tabs 58 are not welded and are collected in groups of five. The tabs 50 from the first fifteen individual cells are placed between a first clamp plate 48 and terminal 42. The tabs 52 from the second fifteen individual cells are placed between the terminal 42 and a bottom plate 54. In FIG. 2, the holding device 30 used is a rivet which passes through the holes formed in the top plate 48, tabs 50 and 52, terminal 42 and the bottom plate 54. The plain end of the rivet 56 is hammered down to form the second head 56. In some designs, terminal 42 may be omitted.

Figure 3:
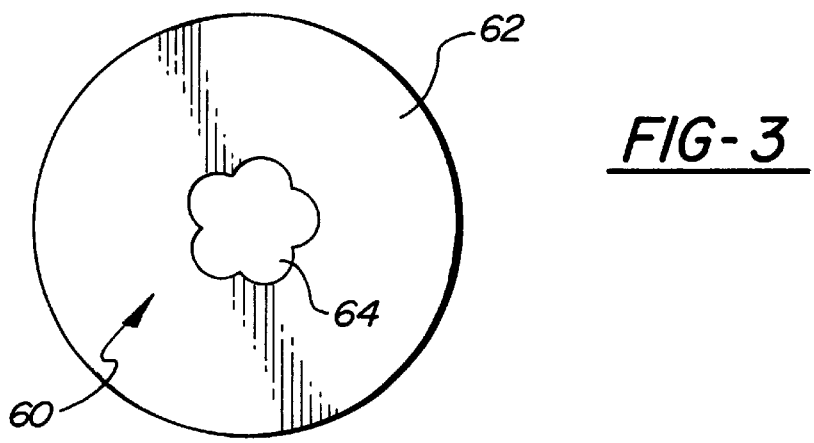
FIG. 3 is a top view of an internal tooth washer.
Figure 4:
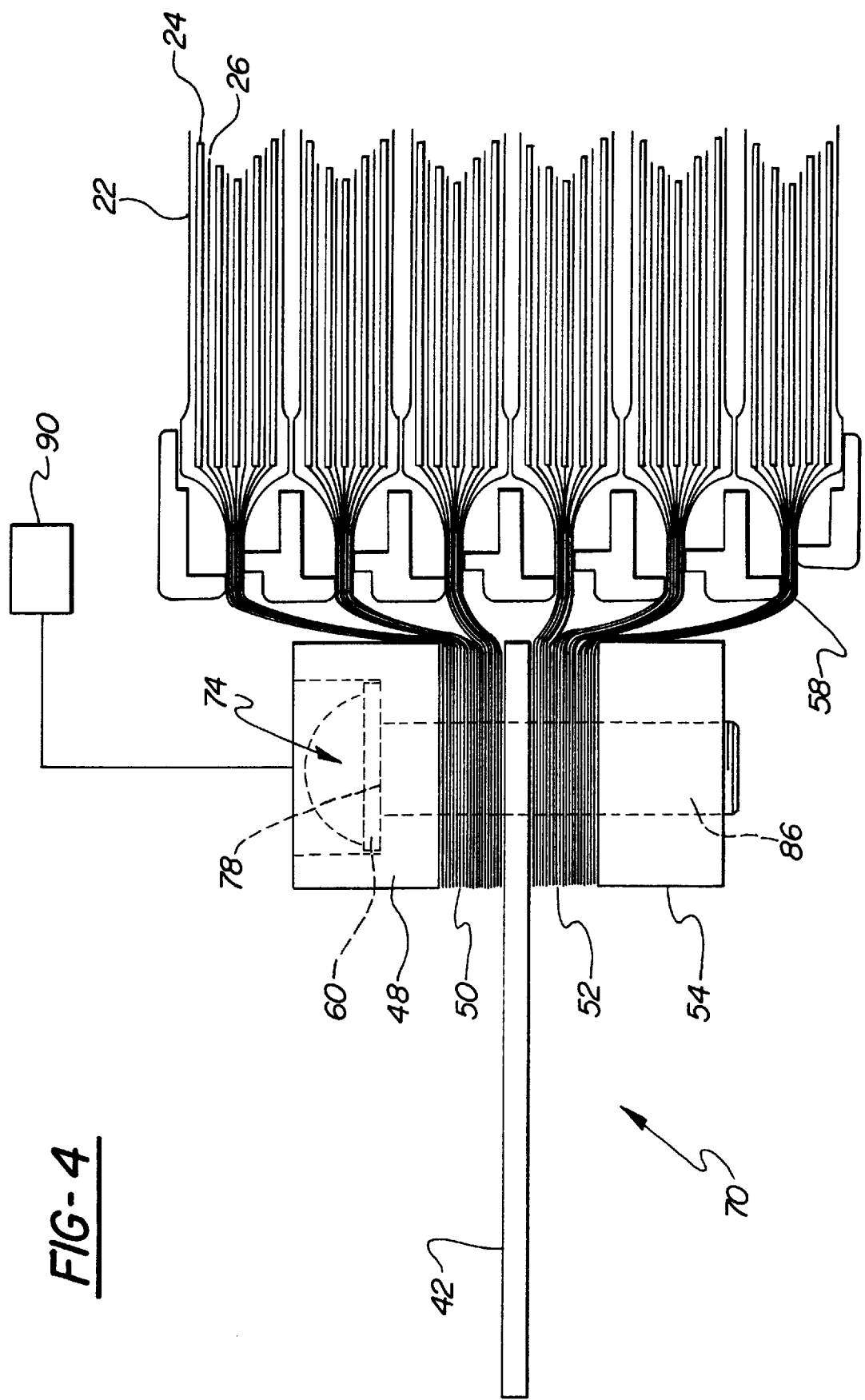
FIG. 4 illustrates the second embodiment. It shows a partial cross-section and partial side view of a portion of the batery of FIG. 1 after the multicell battery is put together wherein a counter bored bolt is used as a holding device.

FIG. 4 illustrates the second embodiment. This is a partial cross-sectional and partial side view of a portion of the multicell battery of FIG. 1. after the multicell battery is assembled using the counter bored bolt 74 as a holding device. The bolt is secured to the bottom plate 54 with the help of the threaded hole 86 formed in the bottom plate, and the head of the bolt locked against a flange or shoulder 78 of the top plate 48 through a washer 60. Top plate 48 has a through hole through which the bolt passes. It is understood, that any other holding device which can be used for the purposes of holding the bus structure is also included into the scope of the present invention. The fastener system of tab bussing as shown in FIG. 4 employs a lock washer 60 with the special shape 64 shown in FIG. 3. FIG. 4 illustrates schematically the internal tooth washer 60 and a pneumatic device 90 used for applying the external mechanical torque to the bolt 74.

The device 90 and the manner of applying torque is known to those skilled in the art and will not be described herein. This particular lock washer has the generic name of the internal tooth washer. The internal tooth washer can be made from bronze, steel, or aluminum. The internal tooth washer has a shape that enables the maximum surface area of contact with the bolt. When placed beneath the head of the bolt, the tooth washer allows the application of maximum external mechanical torque to the holding device in order to secure the holding device to the bottom plate. It is understood that any other lock washer which allows the application of sufficient external mechanical torque is also within the scope of the present invention.

Previous multicell designs for the large lithium polymer batteries suffered from the inconsistent alignment from cell to cell, shifting of cells during handling, and poor energy efficiency. To fix these problems the fastener method of tab bussing employs the special fixture frame 132 shown in FIG. 6. The fixture frame has a plurality of alignment pins 140 which are used for alignment of the anode and cathode tabs before the tab bussing structure is formed.

The fastener method of tab bussing includes the following steps.

At first the holding holes and the alignment holes are formed (such as by drilling or by stamping) in the anode and cathode tabs, a terminal such as terminal 42 in FIGS. 2, 4 and in the top and bottom clamp plates 48, 54.

Figure 6:
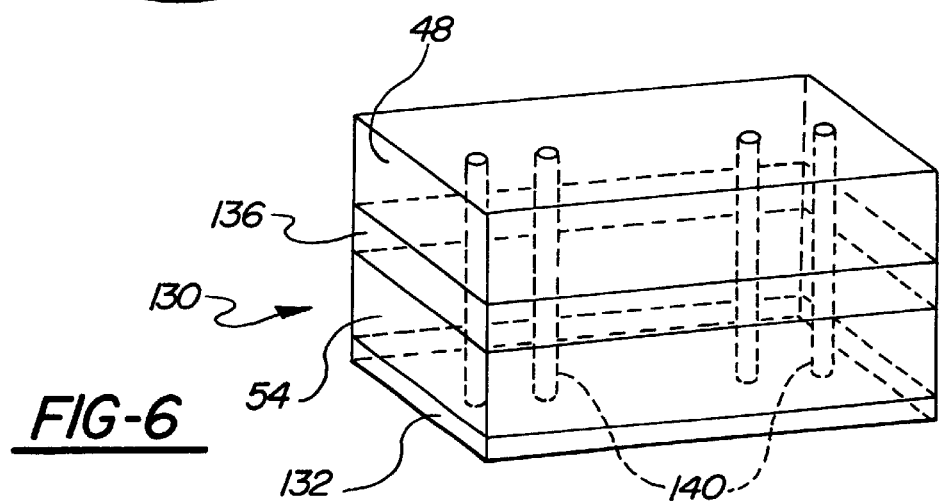
FIG. 6 is a perspective view of some of the parts of the fixture of FIG. 5 and the tab bussing structure of FIG. 2 to show the process of alignment of the tab bussing structure wherein the pins of the fixture are used to align the tabs of the multicell battery.
Figure 5:
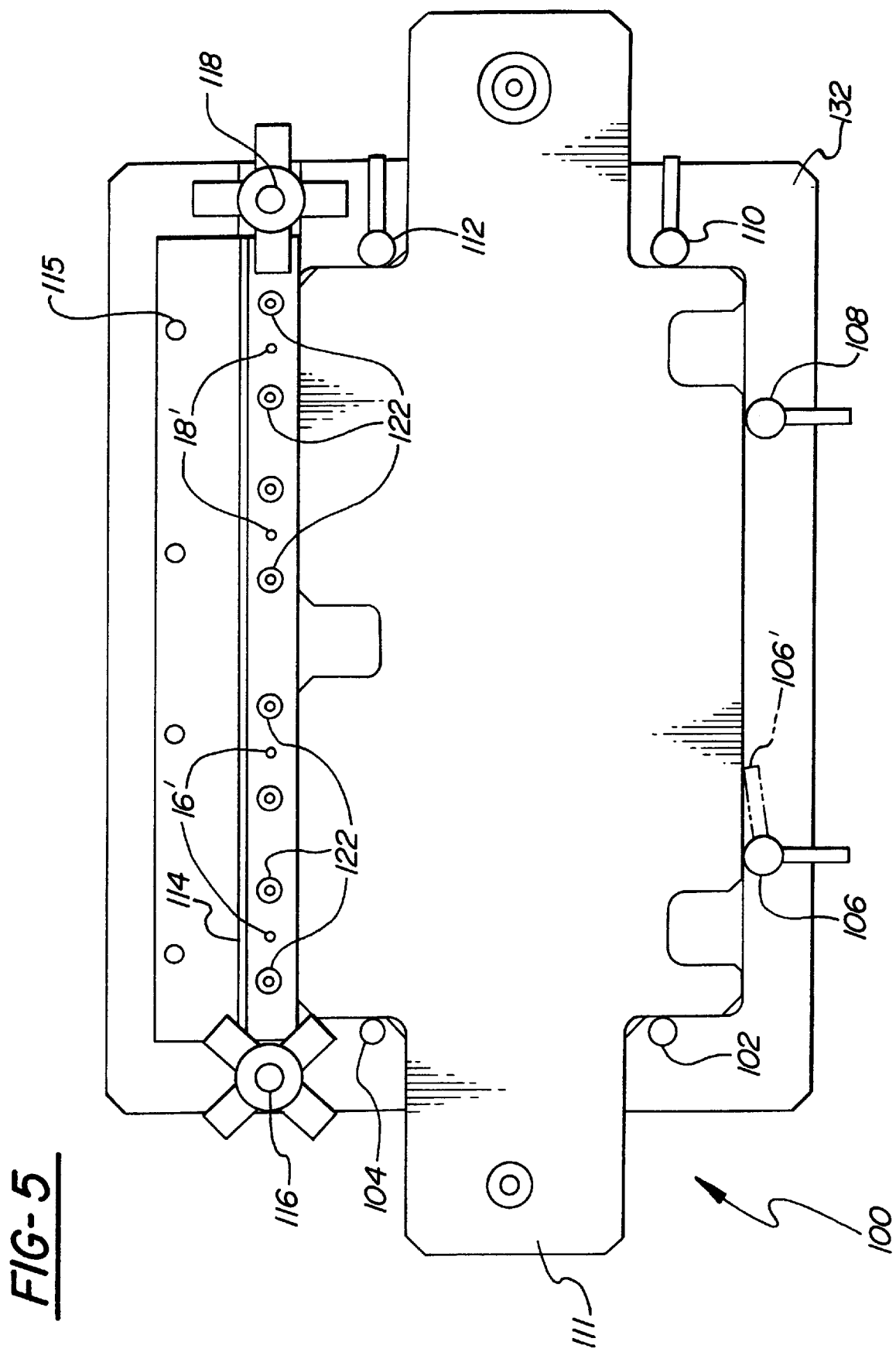
FIG. 5 is a top view of a fixture used for the tab flattening step during an alignment process of the tab bussing.

The second step is the step of alignment. FIG. 6 illustrates the process of alignment using the fixture 132 with the pins 140. The frame part 132 of the fixture is laid down. The bottom plate 54 is placed on the fixture so that the pins 140 pass through the alignment holes formed in the bottom plate 54. The anode tabs and anode terminals, and cathode tabs and the cathode terminals, stacked in the manner shown in FIGS. 2, 4, are lowered onto frame 132 so that pins 140 (see FIG. 6) also pass through the alignment holes 16 formed in the anode tabs 4 and alignment holes 18 formed in the cathode tabs 6 (see FIG. 1) represented in FIG. 6 as tabs 136, the alignment holes in the respective terminal (e.g. terminal 42 of FIGS. 2, 4, but terminal not shown in FIG. 6) and the alignment holes in the upper plate 48 (see FIG. 6). Therefore, all tabs are aligned by means of the four pins. As shown in FIG. 5, the alignment process results in alignment of the entire multicell battery which is located by pins and by levers 106, 108, 110, 112.

Each of the levers is a simple machine consisting of a rigid body, typically a metal bar, connected perpendicularly to plate 132, pivoted on a fixed fulcrum, so that it is rotatable to another position such as 106' shown in dotted lines for lever 106 in FIG. 5, to align the different cells in a battery assembly.

As shown in FIG. 5 the upper portion 114 of the fixture is a narrow bar 114 with the alignment holes 16' and 18' and with oversized holes 122. Portion 114 is screwed down towards plate 132 using handles 116 and 118 after the tabs 4, 6 and the terminals have been placed onto plate 132. The fixture 114 puts pressure and flattens all tabs, together, when the tabs are placed between plates 132 and bar 114. This step is important because otherwise the bolt may not be able to reach and be threaded into the bottom clamp plate 54 until after the tabs are flattened. Furthermore, by flattening the tabs, any gaps between adjacent tabs in the two bussing structures formed are minimized so as to reduce electrical resistance between the tabs, and therefore the overall resistance of the bussing structure, unlike the prior art bussing structure.

After the bus structure is aligned but before the tabs are flattened, pins 140 are removed, and a protective cover 111 is placed on top of the battery assembly to protect the individual cells during the step of assembling and to hold the plates and tabs in position by virtue of its weight when bar 114 is screwed downwards. The removal of pins 140 prior to this process allows a small amount of shifting of the tabs in the process to flatten the tabs. The protective cover is located by levers 106, 108, and 110 and by fixed posts 102 and 104. See FIG. 5.

After the flattening of the tab structure is completed, eight elongated holding devices such as bolts or rivets are inserted into the holding holes 12 and 14 (see FIG. 1) and secured to the bottom clamp plate 54 (see FIG. 6). The head of the bolt or rivet is smaller than the oversized holes 122 in the upper part of the fixture 114 (see FIG. 5). Therefore after the holding device is secured to the bottom plate 54 (see FIG. 6) the fixture 114 can be retrieved by unscrewing the same handles 116 and 118 (see FIG. 5).

If the holding device is a rivet, the step of hammering down the plain end to form the second head (or flash or mushroom) is sufficient to secure the rivet to the bottom plate.

If the holding device is a bolt, the bolt is first inserted into a lock washer 60 before insertion into the tabs. The next necessary step is a step of rotating the bolt so that it is secured by getting through into and engage the threaded hole in the bottom plate. The typical bolt is 6-40, Φ138 bolt. A counter bored bolt can be machined into the top clamp plate to reduce overall bussing height by recessing the bolt head. See FIG. 4.

The step of rotating is performed by the pneumatic device 90 which applies the external mechanical torque to the bolt relative to the bottom plate 54. The special shape lock washer, for instance the bronze tooth washer, allows the bolt to sustain the maximum applied mechanical torque. The maximum applied torque is still a relatively small torque of approximately 14 inch-pound comparatively with the regularly home-used mechanical torques reaching foot-pounds.

If a bolt is used as a holding device, the height of the bussing structure is less than the height of the bussing structure in the case of rivet; therefore the battery with the bolt as a holding device occupies less space. After the bolts are secured to the bottom plate by applying the external mechanical torque and after the upper part of the fixture is removed by unscrewing the handles, a modular multicell battery is lifted from fixture plate 132. The process of constructing the multicell battery using the fastener method of tab bussing is completed.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of tab bussing for a multicell battery, said multicell battery including a plurality of individual cells, each cell including at least one anode tab and one cathode tab, said method comprising the steps of:

forming at least one hole through each of the anode and cathode tabs of each of said individual cells;

putting the cells alongside one another to form a battery;

aligning the anode tabs of the plurality of cells by reference to the holes in the anode tabs;

aligning the cathode tabs of the plurality of cells by reference to the holes in the cathode tabs;

inserting into a hole formed through the anode tabs of each said cells a first holding device and securing said first device to said anode tabs; and inserting into a hole formed through the cathode tabs of each said cells a second holding device and securing said second device to said cathode tabs.

2. The method of claim 1, wherein the forming step forms one alignment hole and one holding hole in each anode and cathode tab, wherein the aligning steps align the anode or cathode tabs by reference to the alignment holes in the anode or cathode tabs, and wherein said inserting steps insert the first or the second holding device into the holding hole in each anode or cathode tab.

3. The method of claim 2, wherein said method is performed using a fixture having at least two pins, and wherein said aligning steps include threading one pin through the alignment holes of the anode tabs of said individual cells in order to align the anode tabs, and threading the other pin through the alignment holes of the cathode tabs in order to align the cathode tabs of said individual cells, prior to the inserting steps.

4. The method of claim 1, wherein each of said inserting and securing steps includes a step of assembling using an assembling device, said assembling device including a first clamp plate and a second clamp plate, said first clamp plate including a through hole, and wherein said second clamp plate includes a threaded hole, the step of assembling including a step of inserting said first or second holding device into said through hole of said first plate before inserting the holding device into the holes in the anode or cathode tabs and, after inserting the holding device into the holes in the tabs, rotating said first or second holding device into said threaded hole in the second clamp plate in order to secure said first or second holding device to said second plate.

5. The method of claim 1, wherein each of said inserting and securing steps includes a step of assembling using an assembling device, said assembling device includes a first clamp plate and a second clamp plate, and wherein each of said first and second clamp plates includes a through hole, the step of assembling including a step of inserting said first or second holding device into said through hole of said first plate before inserting the holding device with the holes in the anode or cathode tabs, and, after inserting the holding device with the holes in the tabs, inserting said first or second holding device into said through hole of said second plate, and a step of making a flash on the bottom of said holding device in order to secure said first or second holding device to said second plate.

6. The method of claim 1, wherein said method further includes a step of putting pressure and flattening said anode or cathode tabs together by using a fixture.

7. The method of claim 1, wherein said first or second holding device includes a lock washer, said method further comprising a step of applying an external mechanical torque to the lock washer with respect to two clamping plates for clamping the tabs, to minimize electrical resistance of said multicell battery.

8. The method of claim 7, wherein said mechanical torque applying step applies the torque by a pneumatic device.

9. A tab bussing structure of a multicell battery, said multicell battery including a plurality of individual cells, said battery comprising:

a plurality of tabs, at least one for each individual cell, each said tab having at least one hole therein; and at least one bolt, wherein each said bolt passes through a hole of a tab of each cell;

a first clamp plate with at least one through hole therein and a second clamp plate with at least one threaded hole therein, said two clamp plates placed adjacent each other with the plurality of tabs between the plates;

wherein each said bolt passes through the first clamp plate and the tabs and is secured to said second clamp plate by means of the threaded hole in the second clamp plate.

10. The structure of claim 9, wherein said first clamp plate includes at least one through hole and at least one alignment hole, and wherein said second clamp plate includes at least one threaded hole and at least one alignment hole.

11. The structure of claim 9, further comprising a lock washer.

12. The structure of claim 11, wherein said lock washer is a bronze internal tooth washer.

13. A multicell battery includes a plurality of individual cells, each cell comprising:

an anode layer;

a cathode layer;

an electrolyte layer separating the anode and cathode layers;

a tab with at least one hole therein;

said battery further comprising:

a first clamp plate with at least one through hole therein and a second clamp plate with at least one threaded hole therein, said two clamp plates placed adjacent each other with the tabs of the individual cells between the plates;

at least one holding device, wherein said holding device passes through the first clamp plate and a hole in a tab of each cell;

wherein said holding device is secured to said second clamp plate by means of the threaded hole in the second clamp plate.

14. The multicell battery of claim 13, wherein said multicell battery includes thirty individual cells.

15. The battery of claim 14, wherein five said individual cells are placed in a stack, and wherein six said stacks, said first plate and said second clamp plates comprise a single structure, and wherein each said holding device passes through the holes formed in all the cells and in the first and the second clamp plates in said structure.

16. The battery of claim 13, wherein each said individual cell is a lithium-polymer battery.

* * * * *